(12) United States Patent
Baldwin

(10) Patent No.: US 11,489,323 B1
(45) Date of Patent: Nov. 1, 2022

(54) POWERED WALL PLATE WITH ADJUSTABLE PLUG PRONGS

(71) Applicant: Jeffrey P. Baldwin, Anthem, AZ (US)

(72) Inventor: Jeffrey P. Baldwin, Anthem, AZ (US)

( * ) Notice: Subject to any disclaimer, the term of this patent is extended or adjusted under 35 U.S.C. 154(b) by 126 days.

(21) Appl. No.: 17/168,819

(22) Filed: Feb. 5, 2021

(51) Int. Cl.
*H02G 3/14* (2006.01)

(52) U.S. Cl.
CPC .................................. *H02G 3/14* (2013.01)

(58) Field of Classification Search
CPC ............ H02G 3/14; H02G 3/08; H02G 3/081; H05K 5/00; H05K 5/02; H05K 5/03; H01R 13/447; H01R 13/6395; H01R 25/003; H01R 31/06; H01R 13/6397; H01R 25/006
USPC .................. 174/66, 67, 50, 480, 481, 53, 57; 220/3.2, 3.3, 241, 242; 439/135, 136, 439/140, 147, 149, 373, 535, 536
See application file for complete search history.

(56) References Cited

U.S. PATENT DOCUMENTS

| | | | |
|---|---|---|---|
| 3,522,595 A | 8/1970 | White | |
| 4,514,789 A | 4/1985 | Jester | |
| 4,536,694 A | 8/1985 | McCarty | |
| 4,835,343 A | 5/1989 | Graef | |
| 6,026,605 A * | 2/2000 | Tippett | H02G 3/14 220/241 |
| 6,051,788 A | 4/2000 | Nichols | |
| 6,297,450 B1 | 10/2001 | Yu | |
| 6,423,900 B1 | 7/2002 | Soules | |
| 6,923,663 B2 | 8/2005 | Oddsen | |
| 6,977,341 B1 | 12/2005 | Gustaveson, II | |
| 6,981,896 B2 | 1/2006 | Su | |
| 6,993,417 B2 * | 1/2006 | Osann, Jr. | G05B 15/02 340/635 |
| 7,140,922 B2 | 11/2006 | Luu | |
| 7,247,793 B2 | 7/2007 | Hinkson | |
| 7,271,339 B2 | 9/2007 | Dinh | |
| 7,833,037 B2 | 11/2010 | Reusche | |
| 7,896,702 B2 | 3/2011 | Stiehl | |
| 8,668,347 B2 | 3/2014 | Ebeling | |
| 8,668,647 B2 | 3/2014 | Eskandari | |
| 8,864,517 B2 | 10/2014 | Cohen | |
| 8,912,442 B2 | 12/2014 | Smith | |
| 9,329,607 B2 | 5/2016 | Kevelos | |
| 9,362,728 B2 | 6/2016 | Smith | |
| D781,241 S | 3/2017 | Knight | |
| 9,732,921 B2 | 8/2017 | Chien | |

(Continued)

*Primary Examiner* — Angel R Estrada
(74) *Attorney, Agent, or Firm* — Booth Udall Fuller, PLC; Kenneth C. Booth

(57) ABSTRACT

A powered wall plate has a wall plate, an electrical circuit, at least two electrical plug prongs, and at least one mounting screw aperture. The wall plate has a front surface opposite a rear surface, as well as at least one opening extending through the front surface and the rear surface and sized to expose a first electrical receptacle of an electrical device therethrough. The electrical circuit is located between the front surface and the rear surface. The at least two electrical plug prongs are coupled to the electrical circuit within the wall plate and extend away from the rear surface of the wall plate. In addition, the at least two electrical plug prongs are configured to removably mate with a second electrical receptacle of the electrical device. A distance between the at least one mounting screw aperture and the at least two electrical plug prongs is adjustable.

20 Claims, 9 Drawing Sheets

(56) References Cited

U.S. PATENT DOCUMENTS

| | | | |
|---|---|---|---|
| 9,825,414 B2 | 11/2017 | Armstrong | |
| 10,161,806 B2 | 12/2018 | Lermann | |
| 10,276,979 B2 | 4/2019 | Cyzen | |
| 10,903,636 B1 * | 1/2021 | Baldwin | G06F 1/1632 |
| 10,985,516 B1 * | 4/2021 | Gartside | H02G 3/14 |
| 11,277,587 B1 * | 3/2022 | Baldwin | H02G 3/081 |
| 2004/0142601 A1 | 7/2004 | Luu | |
| 2014/0375532 A1 | 12/2014 | Chien | |
| 2015/0340826 A1 | 11/2015 | Chien | |
| 2018/0193545 A1 | 7/2018 | Crnkovich et al. | |

* cited by examiner

POWERED WALL PLATE WITH ADJUSTABLE PLUG PRONGS

TECHNICAL FIELD

Aspects of this document relate generally to powered wall plates, and more specifically to powered wall plates with adjustable plug prongs.

BACKGROUND

Wall plates are well known and are used to fill in the space between an electrical box and an electrical device. Specifically, wall plates are known to provide a more aesthetically pleasing appearance while also preventing access to the electrical device. By preventing access to the electrical device, the user is safer because electrical wiring is not readily accessible.

Wall plates are also known to provide a simple lighting source or powering portable devices USB, but are commonly unsafe and rely on direct, spring biased connections with an installed electrical receptacle. These spring biased electrical connections are unsafe due to the inherent unreliability of the spring biased connections which may short or become damaged over time, leading to electrical and/or fire hazards.

Some electrical devices are manufactured using different dimensions, even within the same country. For example, different manufacturers sometimes locate the mounting screw apertures of the electrical device at a slightly different location with respect to the electrical receptacle. This means that a wall plate which attempts to align with both the mounting screw aperture and the electrical receptacle may not be adaptable to all electrical devices.

SUMMARY

Aspects of this document relate to a powered wall plate, comprising a wall plate having a front surface opposite a rear surface and at least one opening extending through the front surface and the rear surface sized to expose a first electrical receptacle of an electrical device therethrough, at least two prong apertures extending through the rear surface of the wall plate, each of the at least two prong apertures having a width and a height, an electrical circuit located between and detached from the front surface and the rear surface, at least two electrical plug prongs each having a base coupled to the electrical circuit within the wall plate, the at least two electrical plug prongs extending away from the electrical circuit through the at least two prong apertures and configured to move within the at least two prong apertures along an axis parallel to the height of the at least two prong apertures between an upper position and a lower position, wherein when the at least two electrical plug prongs are in the upper position, there is a lower gap between the at least two electrical plug prongs and a lower edge of the at least two prong apertures, when the at least two electrical plug prongs are in the lower position, there is an upper gap between the at least two electrical plug prongs and an upper edge of the at least two prong apertures, and the at least two electrical plug prongs are configured to removably mate with a second electrical receptacle of the electrical device, at least one mounting screw aperture extending through the wall plate and configured to receive at least one mounting screw to attach the wall plate to the electrical device, wherein a distance between the at least one mounting screw aperture and the at least two electrical plug prongs is adjustable, at least one LED light located along a bottom edge of the wall plate and electrically coupled to the electrical circuit, and a photocell exposed on the front surface, electrically coupled to the electrical circuit and to the at least one LED light, and configured to measure an ambient light level.

Particular embodiments may comprise one or more of the following features. The upper gap may span at least 0.001 inches. Each of the at least two electrical plug prongs may have a free end with a cross section larger than a cross section of the base. The powered wall plate may further comprise a protruding front face extending forward of the front surface. The powered wall plate may further comprise a control switch positioned on the front surface and electrically coupled to the at least one LED light, the control switch having an on position, an off position, and an auto position, wherein the control switch is configured to turn on the at least one LED light when the control switch is in the on position, turn off the at least one LED light when the control switch is in the off position, and selectively turn on the at least one LED light when the control switch is in the auto position based on the ambient light level measured by the photocell. The wall plate may have a profile with a first thickness and a second thickness and the second thickness may be less than three times the first thickness.

Aspects of this document relate to a powered wall plate, comprising a wall plate having a front surface opposite a rear surface and at least one opening extending through the front surface and the rear surface sized to expose a first electrical receptacle of an electrical device therethrough, at least two prong apertures extending through the rear surface of the wall plate, each of the at least two prong apertures having a width and a height, an electrical circuit located between the front surface and the rear surface, at least two electrical plug prongs each having a base coupled to the electrical circuit within the wall plate, the at least two electrical plug prongs extending away from the electrical circuit through the at least two prong apertures and configured to move within the at least two prong apertures along an axis parallel to the height of the at least two prong apertures between an upper position and a lower position, wherein the at least two electrical plug prongs are configured to removably mate with a second electrical receptacle of the electrical device, at least one mounting screw aperture extending through the wall plate and configured to receive at least one mounting screw to attach the wall plate to the electrical device, wherein a distance between the at least one mounting screw aperture and the at least two electrical plug prongs is adjustable, and an electrical feature exposed on the wall plate, electrically coupled to the electrical circuit, and configured to receive power from the at least two electrical plug prongs through the electrical circuit.

Particular embodiments may comprise one or more of the following features. When the at least two electrical plug prongs are in an upper position, there may be a lower gap between the at least two electrical plug prongs and a lower edge of the at least two prong apertures, and when the at least two electrical plug prongs are in a lower position, there may be an upper gap between the at least two electrical plug prongs and an upper edge of the at least two prong apertures. The upper gap may span at least 0.001 inches. Each of the at least two electrical plug prongs may have a free end with a cross section larger than a cross section of the base. The electrical circuit may be detached from the front surface and the rear surface. The electrical feature may be at least one light located on the front surface.

Aspects of this document relate to a powered wall plate, comprising a wall plate having a front surface opposite a rear surface and at least one opening extending through the front surface and the rear surface sized to expose a first electrical receptacle of an electrical device therethrough, an electrical circuit located between the front surface and the rear surface, at least two electrical plug prongs coupled to the electrical circuit within the wall plate and extending away from the rear surface of the wall plate, wherein the at least two electrical plug prongs are configured to removably mate with a second electrical receptacle of the electrical device, and at least one mounting screw aperture extending through the wall plate and configured to receive at least one mounting screw to attach the wall plate to the electrical device, wherein a distance between the at least one mounting screw aperture and the at least two electrical plug prongs is adjustable.

Particular embodiments may comprise one or more of the following features. The powered wall plate may further comprise at least two prong apertures extending through the rear surface of the wall plate, wherein the at least two electrical plug prongs extend away from the electrical circuit through the at least two prong apertures. Each of the at least two prong apertures may have a width and a height and the at least two electrical plug prongs may be configured to move within the at least two prong apertures along an axis parallel to the height of the at least two prong apertures. When the at least two electrical plug prongs are in an upper position, there may be a lower gap between the at least two electrical plug prongs and a lower edge of the at least two prong apertures, and when the at least two electrical plug prongs are in a lower position, there may be an upper gap between the at least two electrical plug prongs and an upper edge of the at least two prong apertures. The upper gap may span at least 0.001 inches. Each of the at least two electrical plug prongs may have a base coupled to the electrical circuit and a free end, wherein the free end has a cross section larger than a cross section of the base. The powered wall plate may further comprise an electrical feature exposed on the wall plate, electrically coupled to the electrical circuit, and configured to receive power from the at least two electrical plug prongs through the electrical circuit. The electrical circuit may be detached from the front surface and the rear surface.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
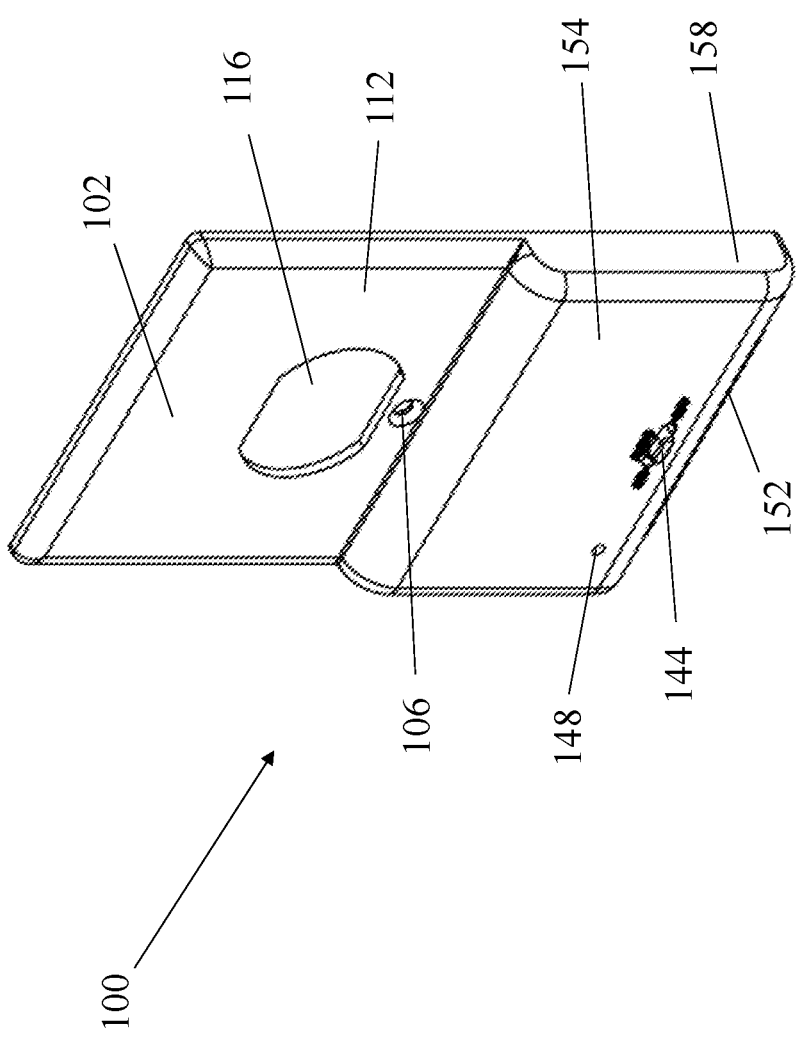
FIG. 1 is a front perspective view of a powered wall plate.
Figure 2:
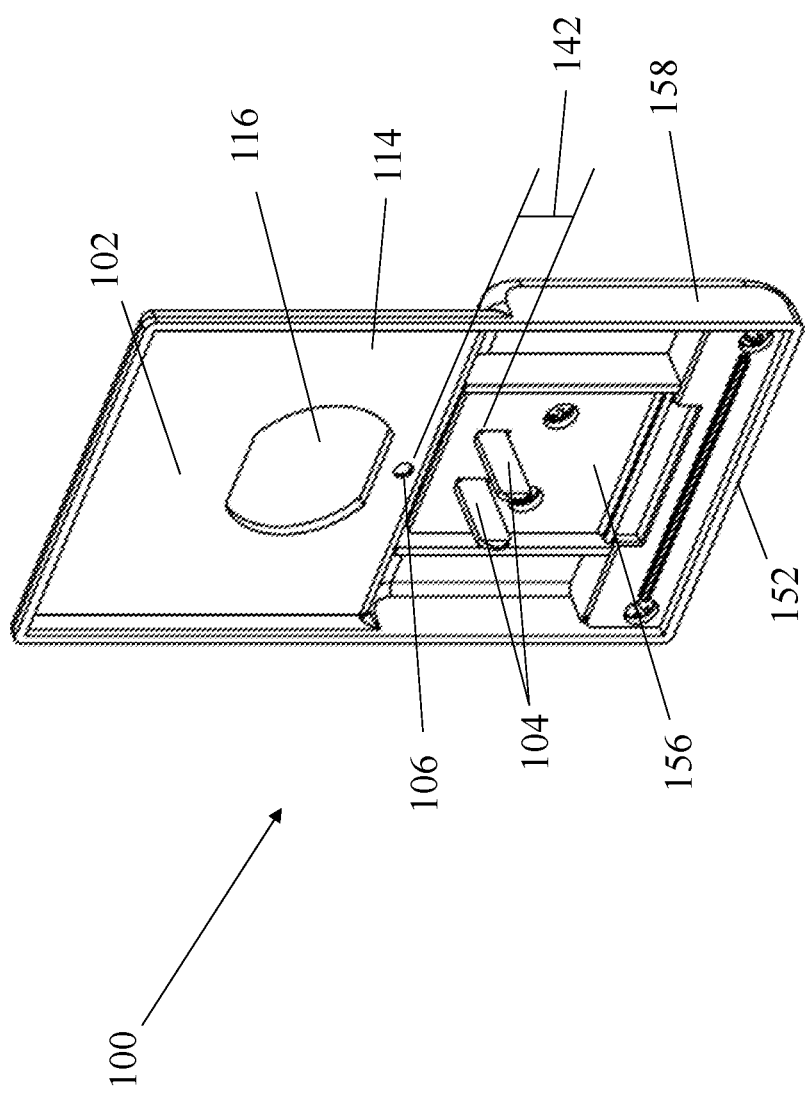
FIG. 2 is a back perspective view of the powered wall plate shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

FIGS. 1-5 illustrate a powered wall plate 100 comprising a wall plate 102, at least two electrical plug prongs 104, at least one mounting screw aperture 106, an electrical circuit 108, and an electrical feature 110. The wall plate 102 has a front surface 112 opposite a rear surface 114. At least one opening 116 extends through the front surface 112 and the rear surface 114. The at least one opening 116 is sized to expose a first electrical receptacle 118 of an electrical device 120 therethrough. At least two prong apertures 122 extend through the rear surface 114 of the wall plate 102. Each of the at least two prong apertures 122 has a width and a height 124. The electrical circuit 108 is located between and may be detached from both the front surface 112 and the rear surface 114. Thus, the electrical circuit 108 may "float" within the wall plate 102 and thus be capable of moving within the wall plate 102. In some embodiments, the electrical circuit 108 comprises a printed circuit board (see FIG. 4).

FIGS. 6-9 illustrate various views of the at least two electrical plug prongs 104. The at least two electrical plug prongs 104 each have a base 126. Each base 126 is coupled to the electrical circuit 108 within the wall plate 102, and the at least two electrical plug prongs 104 extend away from the electrical circuit 108 through the at least two prong apertures 122. Each of the at least two electrical plug prongs 104 also has a free end 128. The free end 128 of each electrical plug prong 104 may have a cross section larger than the cross section of the base 126. The at least two electrical plug prongs 104 may be configured to move within the at least two prong apertures 122 along an axis parallel to the height 124 between an upper position (see FIGS. 8-9) and a lower position (see FIGS. 6-7). Because the electrical circuit 108 is coupled to the at least two electrical plug prongs, as the at least two electrical plug prongs 104 move within the at least two prong apertures 122, the electrical circuit 108 moves as well. This is possible because the electrical circuit 108 is not attached to the front surface 112 or the rear surface 114. When the at least two electrical plug prongs 104 are in the upper position, there is a lower gap 130 between the at least two electrical plug prongs 104 and a lower edge 132 of the least two prong apertures 122 (see FIG. 9). On the other hand, when the at least two electrical plug prongs 104 are in the lower position, there is an upper gap 134 between the at least two electrical plug prongs 104 and an upper edge 136 of the at least two prong apertures 122 (see FIG. 7). This allows the at least two electrical plug prongs 104 to move along the axis parallel to the height 124. The upper gap 134 may span at least 0.001 inches. Alternatively, the upper gap 134 may span at least 0.005 inches, 0.01 inches, 0.05 inches, 0.1 inches, 0.15 inches, 0.2 inches, or 0.25 inches. The at least two electrical plug prongs 104 are configured to removably mate with a second electrical receptacle 138 of the electrical device 120. Thus, when the at least two electrical plug prongs 104 are installed within the second electrical receptacle 138, the first electrical receptacle 118 is exposed through the at least one opening 116, and is accessible to an electrical plug.

Returning to FIGS. 1-5, the at least one mounting screw aperture 106 extends through the wall plate 102 and is configured to receive at least one mounting screw 140 (see FIG. 4) to attach the wall plate 102 to the electrical device 120. The wall plate 102 covers the gap between the electrical box and the electrical device 120. Thus, by attaching the powered wall plate 100 to the electrical device 120 with at least one mounting screw 140, the gap is more permanently covered, protecting users from accidental contact with the electrical wiring. A distance 142 between the at least one mounting screw aperture 106 and the at least two electrical plug prongs 104 may be adjustable. This allows the powered wall plate 100 to be used with a variety of electrical devices 120, even if each electrical device 120 has a distance 142 of a different length.

The electrical feature 110 is exposed on the wall plate 102, is electrically coupled to the electrical circuit 108, and is configured to receive power from the at least two electrical plug prongs 104 through the electrical circuit 108. The electrical feature 110 may be a light, such as an LED light. The electrical feature 110 may also be a USB port or other charging port or charging feature. For example, the electrical feature 110 may be a wireless charging feature such as a charging pad. Alternatively, the electrical feature 110 may be a sensor, such as a temperature sensor, a motion sensor, a photocell configured to measure an ambient light level, or a smoke or carbon monoxide detector. The electrical feature 110 may also be a camera or some other electrical feature 110.

The powered wall plate 100 may additionally comprise a control switch 144 configured to control the supply of power to the electrical feature 110. Thus, when the control switch 144 is in an on position and power is supplied to the at least two electrical plug prongs 104, power is supplied to the electrical feature 110 as well. When the control switch 144 is in an off position and power is supplied to the at least two electrical plug prongs 104, the electrical feature 110 remains without power and is turned off. In addition, in some embodiments, the control switch 144 has an auto position. When the control switch 144 is in the auto position, the control switch 144 selectively provides power to the electrical feature 110. For example, in embodiments where the electrical feature 110 is a light 146, the control switch 144 in the auto position may selectively turn on the light 146 based on an ambient light level. The ambient light level may be measured by a photocell 148. The light 146 may be an LED light, and may be at least one light or a plurality of lights. In embodiments with a light 146, the powered wall plate 100 may also comprise a window 150 through the wall plate 102 which exposes the light 146 through the front surface 112. The light 146 may be located along a bottom edge 152 of the wall plate 102.

Figure 4:
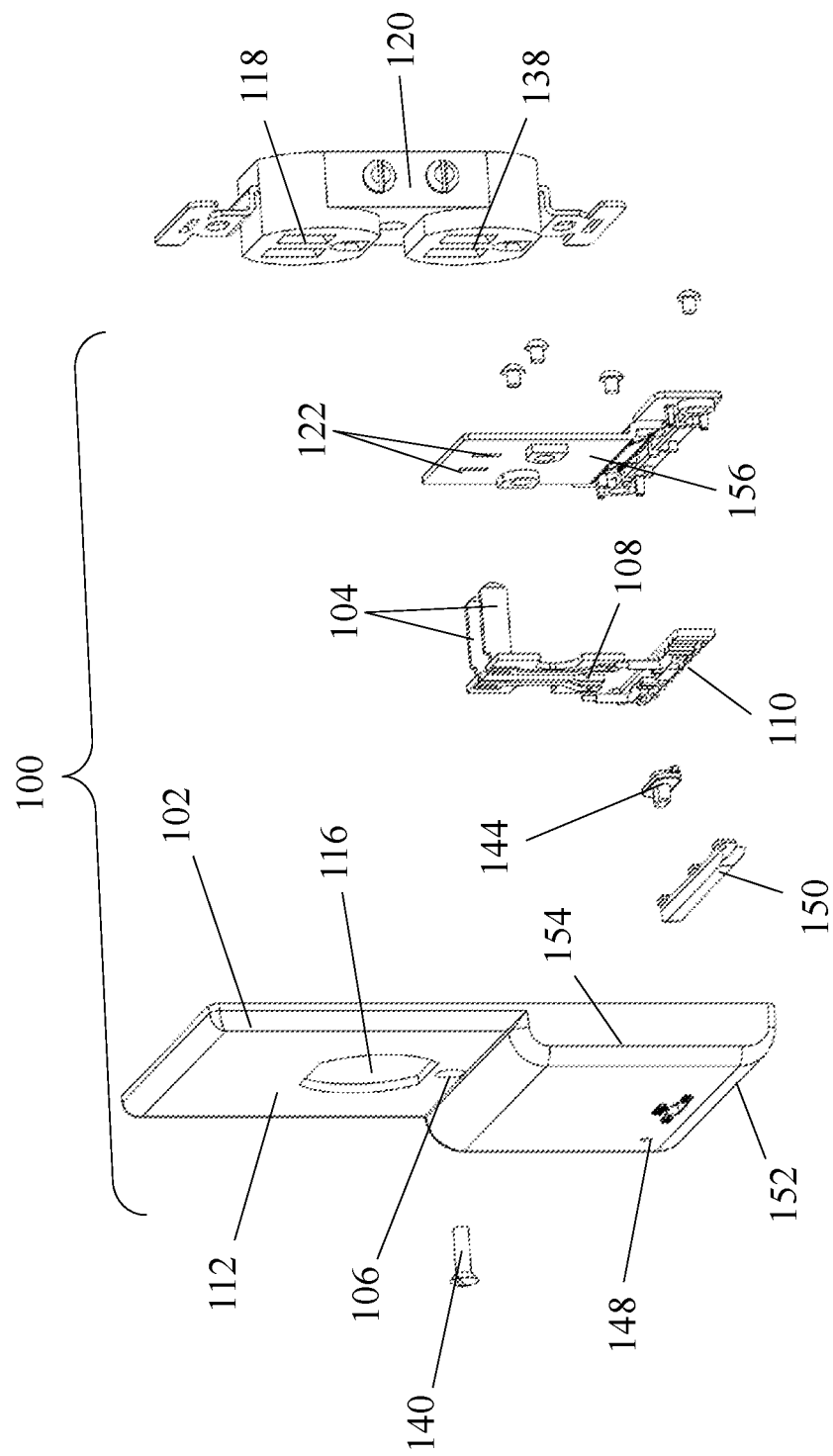
FIG. 4 is an exploded view of the powered wall plate shown in FIG. 1.
Figure 5:
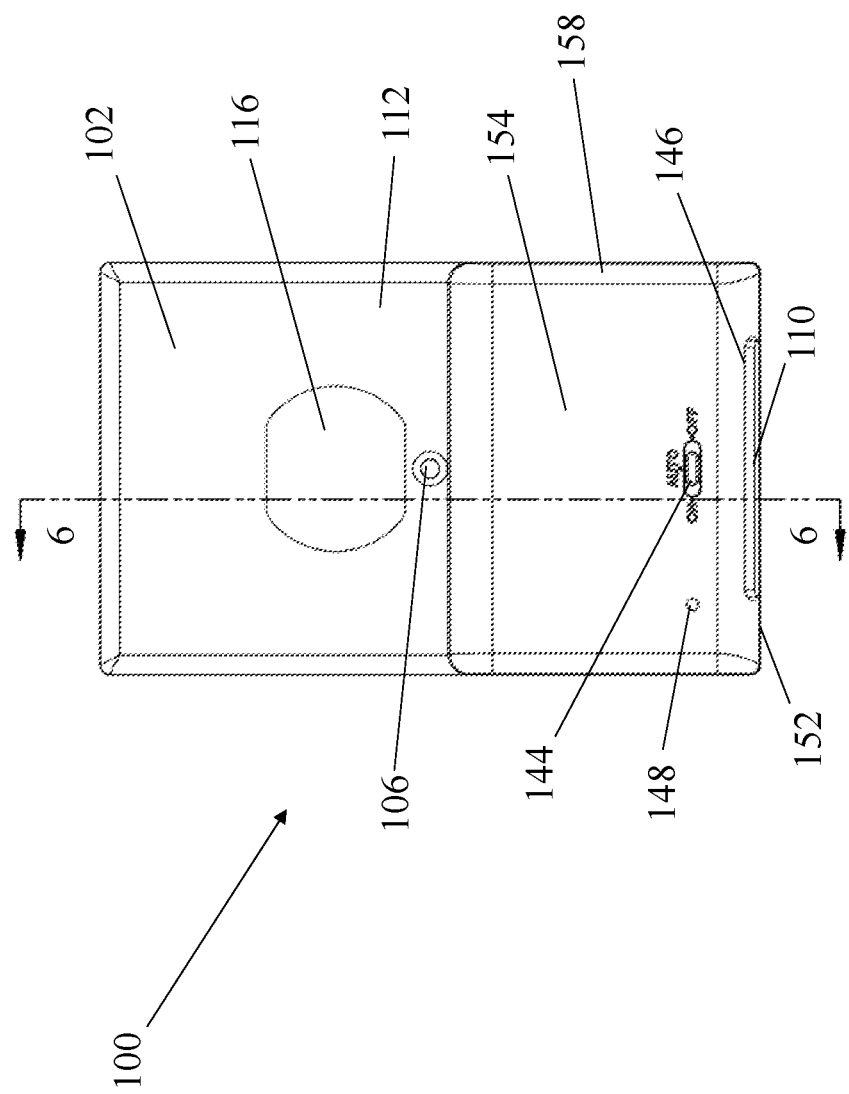
FIG. 5 is a front view of the powered wall plate shown in FIG. 1.
Figure 6:
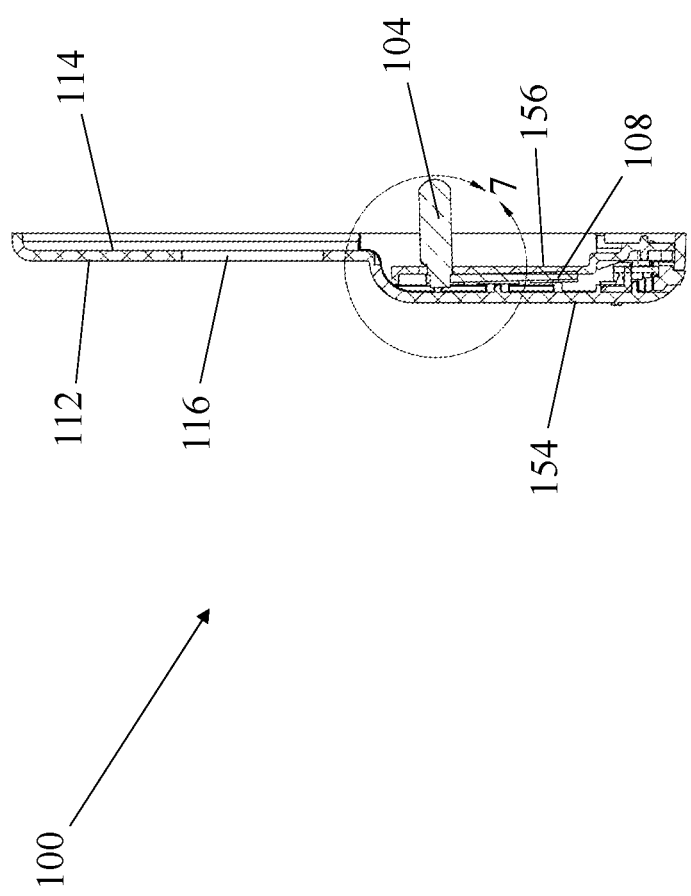
FIG. 6 is a cross-sectional view of the powered wall plate, taken along line 6-6 shown in FIG. 5, with the at least two electrical plug prongs in the lower position.
Figure 7:
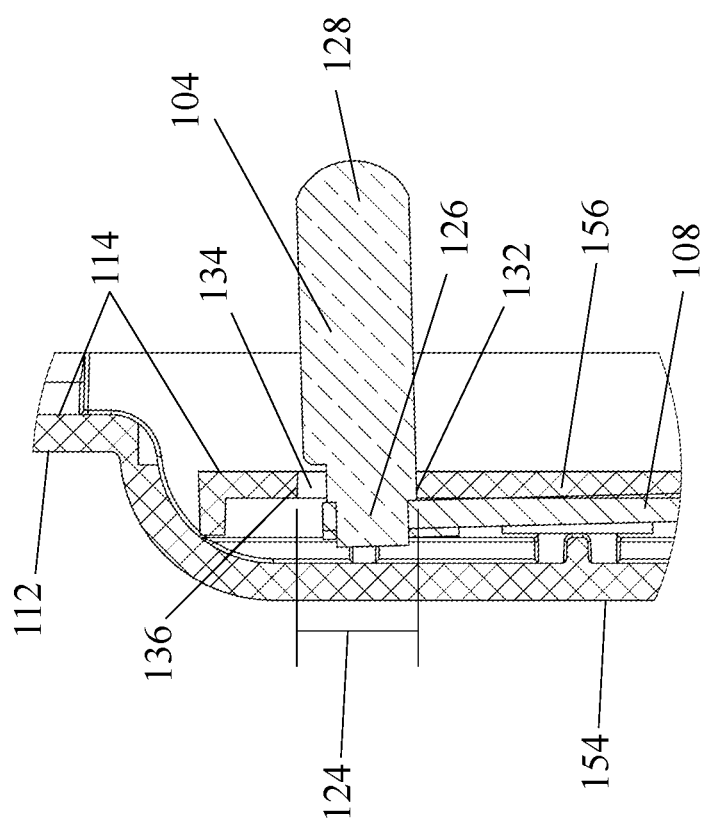
FIG. 7 is a close-up view of the plug prongs in the lower position, taken from circle 7 shown in FIG. 6.
Figure 8:
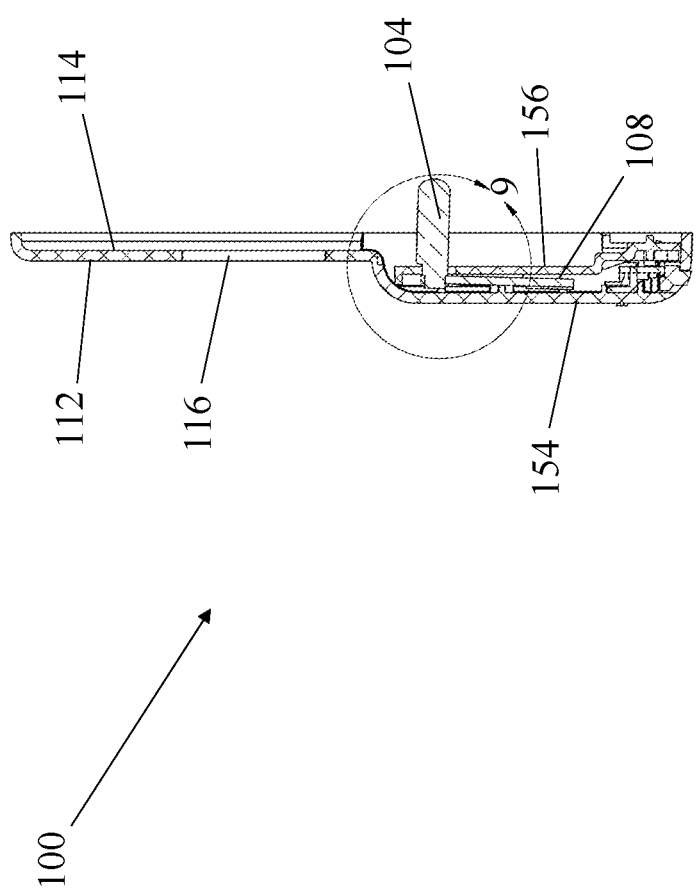
FIG. 8 is a cross-sectional view of the powered wall plate, taken along line 6-6 shown in FIG. 5, with the at least two electrical plug prongs in the upper position.
Figure 9:
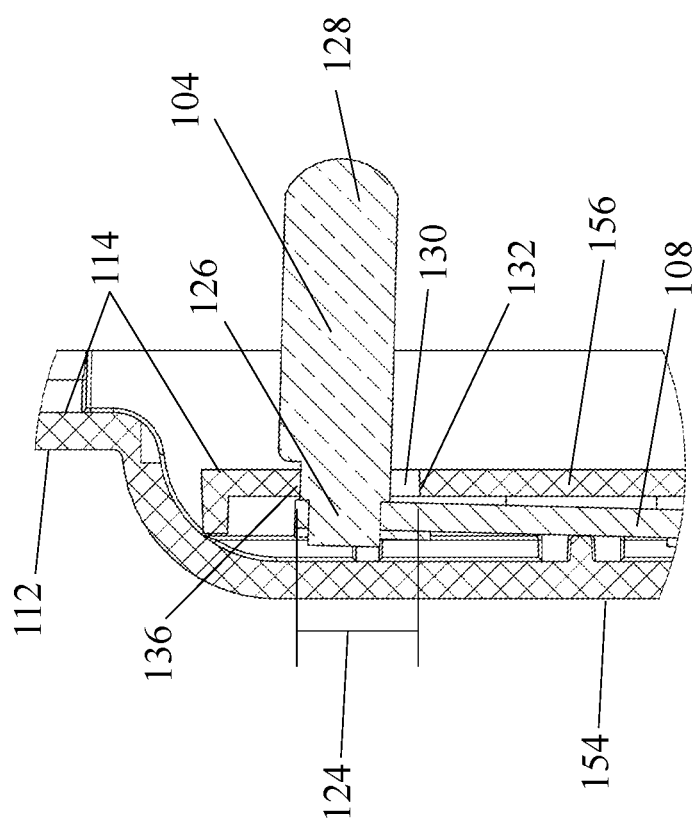
FIG. 9 is a close-up view of the plug prongs in the upper position, taken from circle 9 shown in FIG. 8.

The wall plate 102 may have a protruding front face 154 extending forward of the front surface 112. In such embodiments, the photocell 148 may be exposed on the protruding front face 154 and the control switch 144 may be positioned on the protruding front face 154. In addition, the electrical circuit 108 may be located between the protruding front face 154 and the rear surface 114. The rear surface 114 may comprise a circuit back cover 156, which is removably coupled to the wall plate 102. For example, the circuit back cover 156 may be attached to the wall plate 102 with screws. The circuit back cover 156 is configured to cover the electrical circuit 108 when the circuit back cover 156 is installed on the wall plate 102, as shown in FIG. 4. The at least two electrical plug prongs 104 may extend through the circuit back cover 156, such as through the at least two prong apertures 122.

Figure 3:
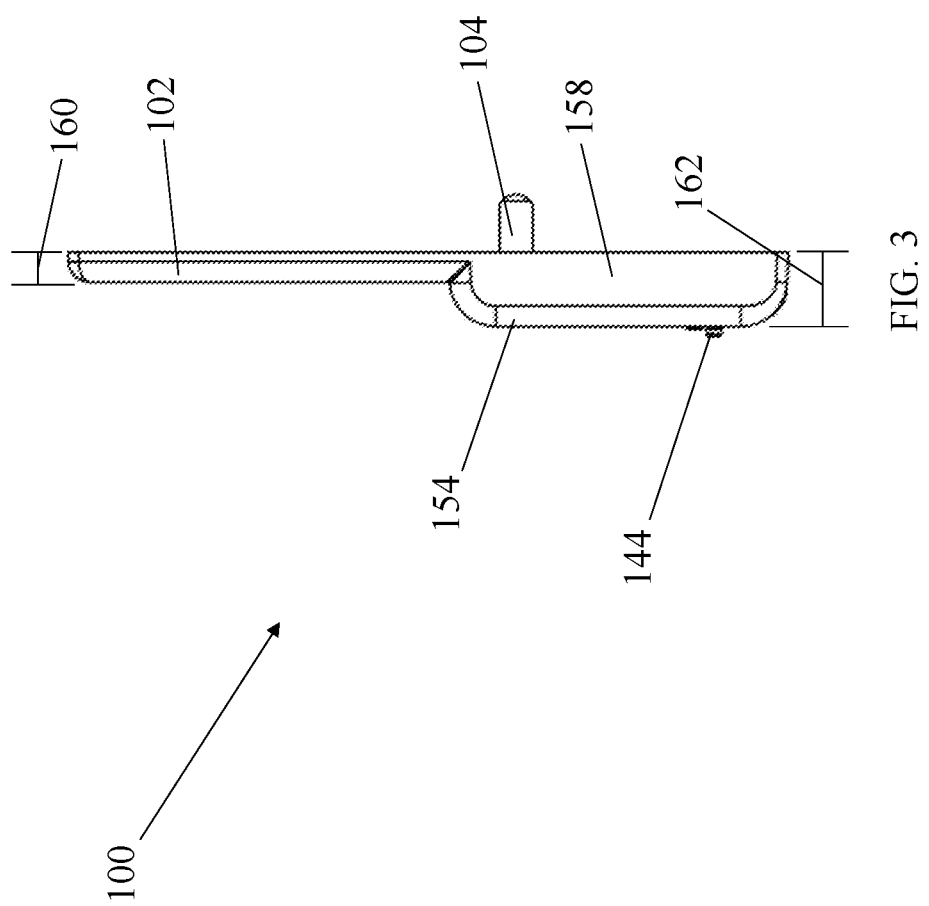
FIG. 3 is a side view of the powered wall plate shown in FIG. 1.

The protruding front face 154 may be located on a bottom half 158 of the wall plate 102. In addition, as shown in FIG. 3, the wall plate 102 may have a profile with a first thickness 160 and a second thickness 162. The first thickness 160 is the thickness of the portion of the wall plate 102 that is nearest to the thickness of a typical wall plate. For example, for the embodiment shown in FIG. 3, the first thickness 160 is the thickness of the top portion of the wall plate 102. On the other hand, the second thickness 162 is the thickness of the thickest portion of the wall plate 102, such as the bottom portion of the wall plate 102 shown in FIG. 3. In such embodiments, the second thickness 162 may be less than three times the first thickness 160. For example, if the first thickness 160 is 0.25 inches, then the second thickness 162 may be less than 0.75 inches.

It will be understood that implementations of a powered wall plate with adjustable plug prongs are not limited to the specific assemblies, devices and components disclosed in this document, as virtually any assemblies, devices and components consistent with the intended operation of a powered wall plate may be used. Accordingly, for example, although particular powered wall plates, and other assemblies, devices and components are disclosed, such may include any shape, size, style, type, model, version, class, measurement, concentration, material, weight, quantity, and/or the like consistent with the intended operation of powered wall plates. Implementations are not limited to uses of any specific assemblies, devices and components; provided that the assemblies, devices and components selected are consistent with the intended operation of a powered wall plate.

Accordingly, the components defining any powered wall plate with adjustable plug prongs may be formed of any of many different types of materials or combinations thereof that can readily be formed into shaped objects provided that the materials selected are consistent with the intended operation of a powered wall plate. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various powered wall plates may be manufactured using conventional procedures as added to and improved upon through the procedures described here. Some components defining a powered wall plate may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling powered wall plates are not limited to the specific order of steps as disclosed in this document. Any steps or sequence of steps of the assembly of a powered wall plate indicated herein are given as examples of possible steps or sequence of steps and not as limitations, since various assembly processes and sequences of steps may be used to assemble powered wall plates.

The implementations of a powered wall plate described are by way of example or explanation and not by way of limitation. Rather, any description relating to the foregoing is for the exemplary purposes of this disclosure, and implementations may also be used with similar results for a variety of other applications employing a powered wall plate with adjustable plug prongs.

What is claimed is:

1. A powered wall plate, comprising:
a wall plate having a front surface opposite a rear surface and at least one opening extending through the front surface and the rear surface sized to expose a first electrical receptacle of an electrical device therethrough;
at least two prong apertures extending through the rear surface of the wall plate, each of the at least two prong apertures having a width and a height;
an electrical circuit located between and detached from the front surface and the rear surface;
at least two electrical plug prongs each having a base coupled to the electrical circuit within the wall plate, the at least two electrical plug prongs extending away from the electrical circuit through the at least two prong apertures and configured to move within the at least two prong apertures along an axis parallel to the height of the at least two prong apertures between an upper position and a lower position, wherein when the at least two electrical plug prongs are in the upper position, there is a lower gap between the at least two electrical plug prongs and a lower edge of the at least two prong apertures, when the at least two electrical plug prongs are in the lower position, there is an upper gap between the at least two electrical plug prongs and an upper edge of the at least two prong apertures, and the at least two electrical plug prongs are configured to removably mate with a second electrical receptacle of the electrical device;
at least one mounting screw aperture extending through the wall plate and configured to receive at least one mounting screw to attach the wall plate to the electrical device, wherein a distance between the at least one mounting screw aperture and the at least two electrical plug prongs is adjustable;
at least one LED light located along a bottom edge of the wall plate and electrically coupled to the electrical circuit; and
a photocell exposed on the front surface, electrically coupled to the electrical circuit and to the at least one LED light, and configured to measure an ambient light level.

2. The powered wall plate of claim 1, wherein the upper gap spans at least 0.001 inches.

3. The powered wall plate of claim 1, wherein each of the at least two electrical plug prongs has a free end with a cross section larger than a cross section of the base.

4. The powered wall plate of claim 1, further comprising a protruding front face extending forward of the front surface.

5. The powered wall plate of claim 1, further comprising a control switch positioned on the front surface and electrically coupled to the at least one LED light, the control switch having an on position, an off position, and an auto position, wherein the control switch is configured to turn on the at least one LED light when the control switch is in the on position, turn off the at least one LED light when the control switch is in the off position, and selectively turn on the at least one LED light when the control switch is in the auto position based on the ambient light level measured by the photocell.

6. The powered wall plate of claim 1, wherein the wall plate has a profile with a first thickness and a second thickness and the second thickness is less than three times the first thickness.

7. A powered wall plate, comprising:
a wall plate having a front surface opposite a rear surface and at least one opening extending through the front surface and the rear surface sized to expose a first electrical receptacle of an electrical device therethrough;
at least two prong apertures extending through the rear surface of the wall plate, each of the at least two prong apertures having a width and a height;
an electrical circuit located between the front surface and the rear surface;
at least two electrical plug prongs each having a base coupled to the electrical circuit within the wall plate, the at least two electrical plug prongs extending away from the electrical circuit through the at least two prong apertures and configured to move within the at least two prong apertures along an axis parallel to the height of the at least two prong apertures between an upper position and a lower position, wherein the at least two electrical plug prongs are configured to removably mate with a second electrical receptacle of the electrical device;
at least one mounting screw aperture extending through the wall plate and configured to receive at least one mounting screw to attach the wall plate to the electrical device, wherein a distance between the at least one mounting screw aperture and the at least two electrical plug prongs is adjustable; and
an electrical feature exposed on the wall plate, electrically coupled to the electrical circuit, and configured to receive power from the at least two electrical plug prongs through the electrical circuit.

8. The powered wall plate of claim 7, wherein when the at least two electrical plug prongs are in an upper position, there is a lower gap between the at least two electrical plug prongs and a lower edge of the at least two prong apertures, and when the at least two electrical plug prongs are in a lower position, there is an upper gap between the at least two electrical plug prongs and an upper edge of the at least two prong apertures.

9. The powered wall plate of claim 8, wherein the upper gap spans at least 0.001 inches.

10. The powered wall plate of claim 7, wherein each of the at least two electrical plug prongs has a free end with a cross section larger than a cross section of the base.

11. The powered wall plate of claim 7, wherein the electrical circuit is detached from the front surface and the rear surface.

12. The powered wall plate of claim 7, wherein the electrical feature is at least one light located on the front surface.

13. A powered wall plate, comprising:
a wall plate having a front surface opposite a rear surface and at least one opening extending through the front surface and the rear surface sized to expose a first electrical receptacle of an electrical device therethrough;
an electrical circuit located between the front surface and the rear surface;
at least two electrical plug prongs coupled to the electrical circuit within the wall plate and extending away from the rear surface of the wall plate, wherein the at least two electrical plug prongs are configured to removably mate with a second electrical receptacle of the electrical device; and at least one mounting screw aperture extending through the wall plate and configured to receive at least one mounting screw to attach the wall plate to the electrical device, wherein a distance between the at least one mounting screw aperture and the at least two electrical plug prongs is adjustable.

14. The powered wall plate of claim 13, further comprising at least two prong apertures extending through the rear surface of the wall plate, wherein the at least two electrical plug prongs extend away from the electrical circuit through the at least two prong apertures.

15. The powered wall plate of claim 14, wherein each of the at least two prong apertures has a width and a height and the at least two electrical plug prongs are configured to move within the at least two prong apertures along an axis parallel to the height of the at least two prong apertures.

16. The powered wall plate of claim 15, wherein when the at least two electrical plug prongs are in an upper position, there is a lower gap between the at least two electrical plug prongs and a lower edge of the at least two prong apertures, and when the at least two electrical plug prongs are in a lower position, there is an upper gap between the at least two electrical plug prongs and an upper edge of the at least two prong apertures.

17. The powered wall plate of claim 16, wherein the upper gap spans at least 0.001 inches.

18. The powered wall plate of claim 13, wherein each of the at least two electrical plug prongs has a base coupled to the electrical circuit and a free end, wherein the free end has a cross section larger than a cross section of the base.

19. The powered wall plate of claim 13, further comprising an electrical feature exposed on the wall plate, electrically coupled to the electrical circuit, and configured to receive power from the at least two electrical plug prongs through the electrical circuit.

20. The powered wall plate of claim 13, wherein the electrical circuit is detached from the front surface and the rear surface.

* * * * *